US010663368B2

(12) United States Patent
Lindemann

(10) Patent No.: US 10,663,368 B2
(45) Date of Patent: May 26, 2020

(54) MODULAR LEAK DETECTOR AND METHOD OF USE

(71) Applicant: Robert Isaac Lindemann, Portland, OR (US)

(72) Inventor: Robert Isaac Lindemann, Portland, OR (US)

( * ) Notice: Subject to any disclaimer, the term of this patent is extended or adjusted under 35 U.S.C. 154(b) by 147 days.

(21) Appl. No.: 16/137,342

(22) Filed: Sep. 20, 2018

(65) Prior Publication Data

US 2020/0096410 A1    Mar. 26, 2020

(51) Int. Cl.
*G01M 3/16* (2006.01)
*H01M 6/34* (2006.01)

(52) U.S. Cl.
CPC ............. *G01M 3/16* (2013.01); *H01M 6/34* (2013.01)

(58) Field of Classification Search
CPC .......... G01M 3/16; H01M 6/34; G04C 10/10; G01N 27/07; G01R 27/22
See application file for complete search history.

(56) References Cited

U.S. PATENT DOCUMENTS

| | | | | |
|---|---|---|---|---|
| 5,272,467 A | * | 12/1993 | Krauleidies | ........... D06F 39/081 340/604 |
| 5,757,197 A | * | 5/1998 | O'Neill | ................... G01F 23/24 324/446 |
| 10,393,687 B1 | * | 8/2019 | Ostashev | ............... G01N 27/07 |
| 2013/0069675 A1 | * | 3/2013 | Woloszyk | .............. G01R 27/22 324/693 |
| 2015/0261193 A1 | * | 9/2015 | Bedol | ..................... G04C 10/00 368/204 |
| 2016/0079586 A1 | * | 3/2016 | Bedol | ................... H01M 2/367 429/52 |
| 2018/0196392 A1 | * | 7/2018 | Bedol | .................... G04C 10/00 |

* cited by examiner

*Primary Examiner* — Albert K Wong
(74) *Attorney, Agent, or Firm* — Mark S Hubert

(57) ABSTRACT

A modular leak detection and notification unit comprised of a self powered leak sensor and a remote relay transmitter. It presents a local audible alarm and a text alarm message signaling the location of the leak to the all cell phones/smart devices that it is directed to notify. Notification may be routed in two different ways via the internet and RF transmission. It can accommodate any number of leak sensors, that can be positioned at a plethora of different potential leak sites.

9 Claims, 2 Drawing Sheets

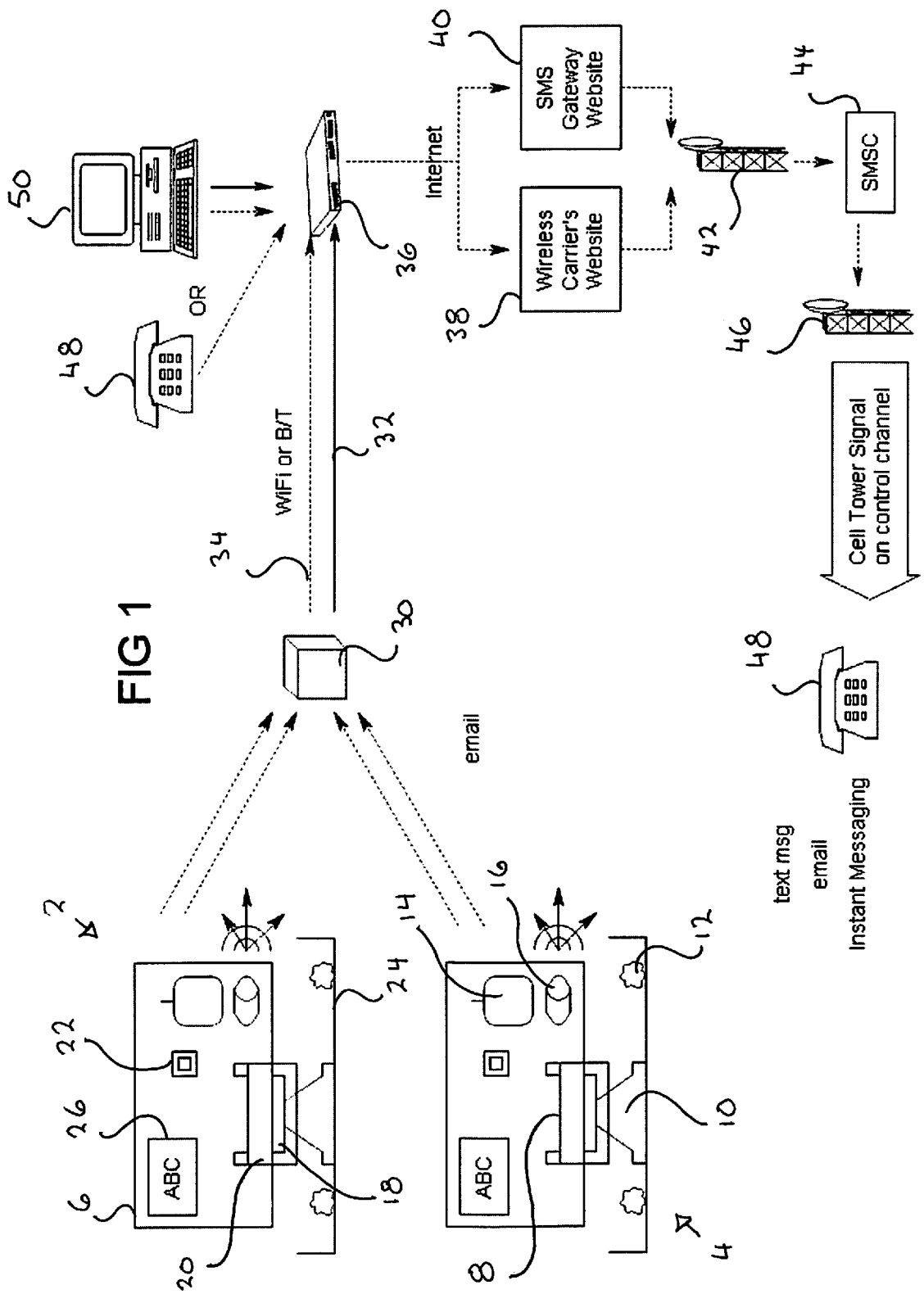

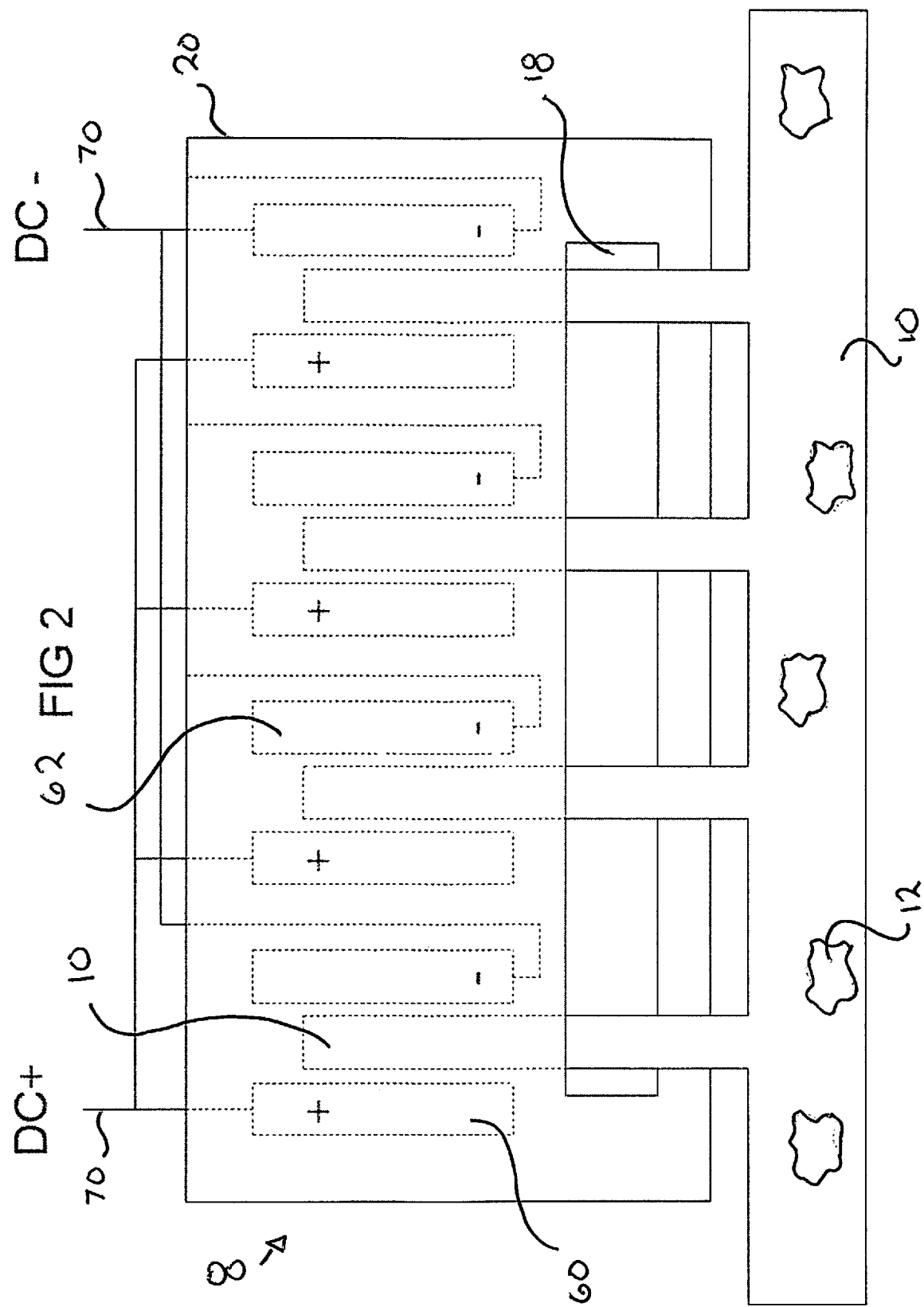

MODULAR LEAK DETECTOR AND METHOD OF USE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to leak detection, and more particularly to remote leak detection notification technology.

BACKGROUND

Most homeowners or commercial building owners have suffered some level of water damage at one time or another. More often than not, it is water damage that occurs slowly through minute leaks and across time. These slow leaks are important to catch as soon as possible for three reasons. First, they are often precursors to catastrophic failures. Catastrophic line failures can only be effectively handled if there are personnel onsite when the failure occurs. Second, the water from slow leaks can find its way to a plethora of locations, some quite distant from the location. Along its path, it can rot, weaken or destroy vast amounts of property as often these type of leaks go undetected for months or even years until the damage becomes extensive enough to be seen. Third, with very slow leaks the surrounding building materials such as drywall, insulation, flooring, etc., can absorb and wick up the moisture resulting in the growth of black mold or other respiratory nightmares.

Presently, there are leak detection systems that can be located adjacent areas prone to leaking, such as under sinks, washing machines, hot water tanks, refrigerators and dishwashers. These require vigilance to ensure their batteries are good. If AC powered, these units are useless in a power outage, if the breaker is opened or if the unit is not firmly plugged in. These units are cumbersome, and if they generate an audible alarm, require the presence of someone to act upon the notification. These types of units are unsightly and often require special wiring or extension cords to power. Lastly, if there are multiple leak prone spots about the building, the owner must bear the costs of several complete devices.

Henceforth, a remote leak detection notification system that could be used in multiple locations where power is not readily available, would fulfill a long-felt need in the leak detection industry. This new invention utilizes and combines known and new technologies in a unique and novel configuration to overcome the aforementioned problems and accomplish this.

BRIEF SUMMARY

In accordance with various embodiments, a compact, wireless leak detection device is provided.

In one aspect, a modular leak detection device than can be expanded to cover multiple areas with only the addition of multiples of one part of the device.

In another aspect, a leak detection device that is self-powered having non degradable batteries.

In yet another aspect, a leak detection device that provides their owner a leak notification over their smart devices, computers, pagers, etc.

In yet another aspect, an additive leak detection device that requires no special wiring.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 1 is a schematic of the modular leak detector with two leak detection sensors; and FIG. 2 is a cross sectional view of the self-powered battery.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another.

It will be understood that when an element or layer is referred to as being "on," "coupled to," "connected to" or "affixed to" another element or layer, it can be directly on, directly coupled to or directly connected to the other element or layer, or, in an indirect fashion, intervening elements or layers may be present. In contrast, when an element is referred to as being "directly on, "directly coupled to," "directly connected to" or "directly affixed to" another element or layer, there are no intervening elements or layers present. Like numbers refer to like elements throughout. As used herein, the term "and/or" includes any and all combinations of one or more of the associated listed items.

The terminology used in the description of the present invention herein is for the purpose of describing particular embodiments only and is not intended to be limiting of the inventive concept. As used in the description of the present invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

As used herein, the term "water activated battery" means a dry constructed battery stored in the dry condition, and activated at the time of use by the addition of water or an aqueous electrolyte. It generates a DC current.

The present invention relates to a novel design for a self-powered, modular leak detection system with remote alarming capabilities. Its simplest embodiment with just a single location leak sensing capability has two components—the leak sensor and the relay transceiver. Although discussed herein as a residential modular leak detection system it is known that it may also be used in military, commercial or industrial settings as well with few, if any modifications.

Looking at FIG. 1 it can be seen that the modular leak detector has at least one leak sensor although in the illustrated embodiment there are two—a first leak sensor 2 and a second leak sensor 4. The leak sensors 2 or 4 have an enclosure 6 that contains a water activated battery 8, an absorbent material 10, an optional electrolyte salt 12, power management module 22, a wireless location beacon 14, an audible alarm horn 16 and exterior labeling 26. The battery's exterior shell 20 has openings 18 formed there through its exterior shell 20 to allow for the admittance of moisture/water from the leak source. This moisture/water may operatively reach the battery internals directly or by wicking (and capillary action) of the absorbent material 10. The absorbent material 10, in the preferred embodiment, forms an isolator between the anode and cathode in the battery's cells and extends outside the battery's exterior shell through the openings 18 and on horizontal and/or vertical surfaces surrounding the leak sensor 2 or 4. The absorbent material's purpose is to wick up as much leaked water (from vertical or horizontal surfaces) as soon as possible and bring it into contact with the anodes and cathodes of the battery thereby providing the earliest opportunity for power generation to alert the owner of a potential problem. There is an optional waterproof pan 24 to channel water to the absorbent material 10.

FIG. 2 shows a cross sectional representation of a multi cell, water powered battery 8. The battery 8 is constructed dry, stored in the dry condition, and activated by contact with water or an aqueous electrolyte. Water activated batteries 8 have an anode 60, a cathode 62, a non-conductor separator that allows water or electrolyte to flow between the anodes and cathodes, two terminals 70 and an exterior shell 20. In this application a nonwoven, absorbent, nonconductive material 10 is used for the dual purpose of separating the electrodes within a cell, and absorbing the electrolyte. (These styles of batteries were designed generally for immersion in water, and here leak detection is desired as soon as any leakage occurs. For this reason, the absorbent material 10 resides between the anode 60 and cathode 62 in the cells but also continues through openings 18 formed in the battery's exterior shell 20 and for a distance onto the ground or in the leak collection pan 24 adjacent the sensor 2 or 4.)

Within the exterior shell 20, multiple cells are connected in series or series-parallel to achieve a desired voltage. The quantity of active material in the electrodes determines the ampere-hour capacity of the battery. The area of the electrodes determines the amount of current the battery can generate. The power output is related to the temperature and salinity of the electrolyte. The battery elements can be optimized in size to power the remainder of the sensor components with a minimum of water leakage or with a flood of water, depending on the type of leak it is to monitor.

Most water-activated batteries use magnesium as the anode material and any of a group of cathode materials. While the preferred embodiment utilizes a magnesium/silver chloride battery, there are numerous types of water activated batteries including but not limited to magnesium/cuprous chloride, magnesium/silver chloride, magnesium/lead chloride, magnesium/cuprous iodide-sulfur, magnesium/cuprous thiocyanate-sulfur, and magnesium/manganese dioxide utilizing an aqueous magnesium perchlorate electrolyte. None of these are efficient as the magnesium/silver chloride system however they are much more cost effective.

These multi cell, water powered batteries 8 are reliable, safe, have high power density, high energy density, instantaneous activation, good pulse loading, long unactivated shelf life and require no maintenance.

The energy producing chemical reaction for the Magnesium/Silver Chloride battery is as follows:

| Magnesium/Silver Chloride | |
|---|---|
| Anode | $Mg\ 2e \rightarrow Mg^{2+}$ |
| Cathode | $2AgCl\ 2e \rightarrow 2Ag\ 2Cl^-$ |
| Overall | $Mg\ 2AgCl \rightarrow MgCl^2\ 2Ag$ |

A side reaction also occurs between the magnesium anode and the aqueous electrolyte, resulting in the formation of magnesium hydroxide, hydrogen gas, and heat.

$Mg\ 2H_2O \rightarrow Mg(OH)_2 H_2$

Since the reaction proceeds best with a strong electrolyte and the modular leak detector will primarily be used for water detection leaks, an electrolytic booster such as a salt will be placed in the battery shell 20, in/on the nonconductive material 10 or in the optional pan 24. (In the preferred embodiment this electrolyte is NaCl.)

The leak sensors 2 or 4 typically can placed on the ground adjacent a site having a leak potential. Such sites in a residential setting are, refrigerators, dishwashers, hot water tanks, toilets, sinks, etc. The leak sensors 2 or 4 may be placed into a waterproof pan 24 to help collect and channel any leaked fluids into the battery's openings 18. The pan 24 may supplement or may eliminate the need for the absorbent material 10 beyond the battery openings 18. (However, if the absorbent material 10 is completely eliminated, there will have to be nonconductive spacers placed between the anodes and cathodes in the battery cells.)

The electrolyte 12 generally is a dry salt used to enhance the chemical reactions inside the battery shell 20 to increase electrical generation. It may be placed inside the battery shell 20, placed on or imbedded in the absorbent substrate 10 or placed outside the battery shell 20 on the pan 24. It also is optional depending upon the specific chemistry of the water activated battery chosen and the type of fluid expected to be leaked. For example, the electrolyte is not necessary where salt water is the circulated fluid with the potential for leakage.

The power management module 22 is a microprocessor controlled unit that regulates and distributes the power generated by the battery 8 at the operating voltages and currents required by the wireless beacon 14 and the alarm horn 16. These devices are well known in the art. In alternate embodiments the power management module may be a simple resistor.

The wireless location beacon 14 is an electronic unit assigned a unique identifier that when powered, broadcasts this identifier wirelessly and locally in a repeating fashion. The wireless beacon may have its unique identifier imbedded in its architecture or it may be input into memory by any of a plethora of known methods. Generally, there is nothing in the data package it broadcasts except its unique identifier. Although any of the commonly available wireless transmission protocols and standards may be used, in the preferred embodiment the wireless transmission from the location beacon 14 will be Bluetooth Low Energy wireless personal area network technology standard used for transmitting data over short distances. It is designed for low energy consumption and cost, while maintaining a communication range similar to that of its predecessor, the Classic Bluetooth. This way a single coin cell battery backup in the remote transceiver will be able to operate for extended periods up to the three year range if A/C power is lost, or the unit bumped and partially unplugged. It is expected that the relay transceiver 30 will be located at the nearest electrical outlet to the leak sensors 2 or 4 and well within 100 feet of the wireless beacon 14 as most building codes require electrical outlets to placed about a residence in closer distances that this.

The alarm horn 16 may be of any of a number of loudspeakers. In the preferred embodiment piezoelectric horns (also referred to as piezoelectric speakers) are used. These are low powered electric devices that use the piezoelectric effect for generating sound. They apply a voltage to a piezoelectric material, which causes vibration that is converted into audible sound using diaphragms and resonators. This style of audible alarm is used because it is resistant to overloads that would destroy other high frequency drivers, and because of its electrical properties, can be used without a crossover. Although they are inferior in midrange and low frequency response, here, volume and high pitch are more important for alarm notification rather than sound quality.

The exterior labeling 26 on the sensors 2 or 4 show the identification numbers specific to that leak sensor, and/or instructions for the setup of the modular leak detector with the relay transceiver it is to be linked to. The labeling may be affixed to the exterior of the enclosure 6 in the form of a sticker, embossing, ink labeling or a hang tag. In the non-preferred embodiment, these identification numbers and setup instructions may be viewable on the internet and only a pointer to that website will be in the exterior labeling. This labeling may be in the form of a matrix or other type bar code that is read into the smart device and input into the application as the identification numbers specific to that leak sensor, and/or instructions for the setup of the modular leak detector with the relay transceiver it is to be linked to.

The second part of the modular leak detector is the relay transceiver 30. This is an electronic transceiver mated to a relay microprocessor that continually or intermittently scans for the wireless location beacon's ID signal, and upon receipt of this signal, determines the alarming beacon's location from its relational database then generates an alert that it sends for routing to the alarm's final destination. The relay microprocessor contains instructions in the form of an application that accesses a database that relates the location beacon's identification to its physical location. This location is what it transmits to the end user for corrective and remedial action. The relay transceiver 30 is connected to the local router for that communication system. This may be by hard wire 32 or wireless connection 34. (It can also be via a satellite connection which is a router to the internet.) In the preferred embodiment, this will be by a common wireless protocol such as low power blue tooth or WiFi. The relay transceiver 30 may be directly connected to an A/C power source (preferred), powered by a battery or both. With today's battery technology it is possible to satisfy all the power needs of this device for approximately 3 years with a coin cell battery.

In operation, the user obtains the correct number of leak sensors 2 required. They are directed via the instructions on the exterior labeling 26 on the sensor's enclosure 6, to download the install application onto their smart device. (The following assumes that the smart device is connected to the local router 36.) The exterior labeling also lists the unique identifier for the location beacon in that enclosure 6. The relay transceiver 30 is plugged into an A/C outlet and its wireless transceiver broadcasts or directly sends a signal to the local router 36. The router sees this signal but will not connect to the relay transceiver 30 without authorization. The install application on the smart device (generally a cell phone) is loaded and accessed, and through a series of on screen instructions prompts the connection of the relay transceiver 30 to the local router. It also prompts the user to input the physical locations where the various leak sensors are physically located into the relational database of the relay microprocessor. Lastly, the install application prompts the input of the cell phone numbers of all of the users to be notified along with the internet address of their specific carriers. In the instruction set on the relay microprocessor is an algorithm that combines the phone numbers with the internet address of their specific cell phone carriers and also with the internet address of a free SMS Gateway provider's website. This allows the alarm text to be routed to the user's smart phone two different ways.

The leak sensor 2 is placed adjacent or beneath the area to be monitored for leakage. When a leak occurs, the water is channeled to the battery openings 18 either directly (as with a catastrophic leak) or via wicking or capillary action of the absorbent material. Once inside the battery, the water contacts (or continues along) the absorbent inner material and chemically reacts with the anodes and cathodes of the battery 8 to produce a current and voltage which is output via the terminals to the power management module 22. Here the power is regulated into the proper current and voltage to power the location beacon 14 and the audible alarm 16. Upon providing power directly to the alarm horn 16, the alarm sounds until power is discontinued. Upon providing the appropriate power to the location beacon 14, it repeatedly sends its unique identification to the relay transceiver 30 via a wireless transmission protocol. The remote transceiver's relay microprocessor is scanning for a wireless signal in the same transmission protocol as that of the location beacon. Upon receipt of the location beacon's signal, the remote transceiver determines which unique identification correlates to which physical location in the residence. The relay microprocessor generates an alert signal comprised of the location of the leak and sends it via the local router 36 and the internet as a http protocol web message to either the wireless carrier's website 38 or to an SMS gateway website 40. From here the signal is converted into the appropriate short message service (SMS) transmission protocol and sent wirelessly as an RF signal to the local cell tower 42 which routes it to the SMSC (Short Message Service Center) 44 which sends it to the closest cell tower 46 that routes it to the end user's cell phone 48 where it is received as a text alert.

In an alternate embodiment, the relay microprocessor may generate an data package sent to the local computer 50 of an email using the user's phone numbers followed by a string of characters specific for each cell phone carrier (i.e. for AT & T it would be the phone number@text.att.net) which is sent via the local computer 50 via the local router 36 and internet and routed as a text message to the users cell phone or smart device. From there it is converted to an SMS protocol message and sent as a RF signal to the users cell phone as outlined above.

One of the benefits of the text messaging alert is that the message will always reach the appropriate cell phone. SMS messages are delivered even if the cell phone is turned off, unpowered or out of range. It is a store-and-message service. Once regular service is once again supplied to the cell phone, any waiting messages will come through. That is why the system has redundancy in that there are two identical but separate text messages sent. Additionally, the local computer may send the text message to a group of cell phones such as the husband, the wife, the kids, the maid etc. (broadcasting).

The method of use is quite simple and is comprised of the following steps:

connecting the wireless transceiver to a power source within wireless transmission range of all leak sensors and a local internet connected router;

following directions on the exterior labeling to access application on an internet connected computer or smart device (cell phone, mobile computing device, tablet, or the like);

downloading the install application onto their smart device or computer;

opening the install application on their smart device or computer and following install prompts;

inputting identification numbers for each sensor, location of each sensor, smart device phone numbers and name of user's cell phone wireless carrier;

connecting the relay transceiver to the local internet connected router;

placing the leak sensors adjacent or beneath the area to be monitored for leakage;

optionally, placing salt onto the absorbent material extending from the opening of the battery; and optionally, placing a leak detection pan beneath the sensors; and optionally placing salt into the leak detection pan.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims. In the way of example, it is known that an alternative embodiment modular leak detector may send an audible message to the user's cell phone as a voice alert rather than, or in conjunction with, the text alert described herein. Here, the application would allow for and store voice recordings for the various leak sensor locations in a relational database that would be accessed upon the receipt of a signal from the transceiver and routed to the cell phone or smart device that had been identified earlier as the destination.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

The leak sensors, relay transceiver and router can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention may include a non-transitory machine-readable medium comprising instructions executable by one or more processors, the instructions comprising instructions to perform the elements of the embodiments as described herein.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto. For example, while discussed using self-powered water batteries, it is envisioned that any other type of self-powered battery that utilizes a fluid for operation identical to the fluid to be monitored for leakage may be an alternate embodiment that adheres to the same basic principles of operation.

Having thus described the invention, what is claimed as new and desired to be secured by Letters Patent is as follows:

1. A modular leak detector, comprising:
    at least one leak sensor; having an enclosure with a water powered battery made of at least one cell with an anode and a cathode, said water powered battery contained in a shell with shell openings formed therethrough and an absorbent material, isolating and between said anode and said cathode, said absorbent material extending from said enclosure through said shell openings to an area adjacent said enclosure, a wireless location beacon with a unique identification, and a power management module electrically connected between said battery and said wireless beacon;
    a remote relay transceiver in wireless communication with said wireless location beacon; and
    a downloadable install application for configuring communication connection between said relay transceiver and a connectable router;
    wherein said wireless location beacon broadcasts its said unique identification to said remote rely transceiver upon receiving power from said water powered battery through said power management module once said absorbent material gets wet, and said relay transceiver transmits a notifying alarm to said connectable router in response to the reception of said unique identifier.

2. The modular leak detector of claim 1 further comprising an alarm horn, said horn operably connect to said power management module to audibly alarm upon generation of said power.

3. The modular leak detector of claim 1 further comprising:
    an amount of sodium chloride disposed on said absorbent material.

4. The modular leak detector of claim 2 further comprising:
    a leak collection pan residing underneath said leak sensor; and
    an amount of sodium chloride disposed in said leak collection pan.

5. The modular leak detector of claim 1 wherein said anode is magnesium, and said cathode is made from the group consisting of silver chloride, cuprous chloride, lead chloride, cuprous iodide-sulfur, cuprous thiocyanate-sulfur, and manganese dioxide utilizing an aqueous magnesium perchlorate electrolyte.

6. The modular leak detector of claim 1 wherein said remote relay transceiver is powered by connection to an A/C source.

7. The modular leak detector of claim 1 wherein said relay transceiver has a relay microprocessor containing a set of instructions that recognizes said unique identifier and generates said notifying alarm with a location of said location beacon.

8. The modular leak detector of claim 1 further comprising an exterior labeling, said labeling providing said unique identification of said wireless location beacon and a direction to access said downloadable install application.

9. The modular leak detector of claim 1 wherein said setup application prompts inputs of said leak sensor location and unique identifier, a notification phone number and a wireless carrier for said phone number.

* * * * *